US008281693B2

(12) United States Patent
Shih

(10) Patent No.: US 8,281,693 B2
(45) Date of Patent: Oct. 9, 2012

(54) METHOD FOR SHAPING A HEXAGONAL TOOL

(76) Inventor: Jui-Chu Shih, Taichung County (TW)

( * ) Notice: Subject to any disclaimer, the term of this patent is extended or adjusted under 35 U.S.C. 154(b) by 366 days.

(21) Appl. No.: 12/792,641

(22) Filed: Jun. 2, 2010

(65) Prior Publication Data

US 2011/0296954 A1 Dec. 8, 2011

(51) Int. Cl.
*B23B 5/16* (2006.01)

(52) U.S. Cl. .................... 82/11; 82/18; 82/117; 29/557; 76/114

(58) Field of Classification Search ................ 82/18, 11, 82/11.1, 117, 123, 1.11; 29/557, 27 R–27 C; 76/114; *B23B 5/16*
See application file for complete search history.

(56) References Cited

U.S. PATENT DOCUMENTS

| | | | | | |
|---|---|---|---|---|---|
| 1,430,004 | A * | 9/1922 | Carlson | 76/114 |
| 4,246,811 | A * | 1/1981 | Bondhus et al. | 81/436 |
| 4,291,568 | A * | 9/1981 | Stifano, Jr. | 72/356 |
| 5,140,877 | A * | 8/1992 | Sloan | 81/439 |
| 5,370,021 | A * | 12/1994 | Shigematsu | 81/436 |
| 5,619,882 | A * | 4/1997 | Godtner | 72/356 |
| 6,032,556 | A * | 3/2000 | Hu | 81/436 |
| 6,681,662 | B2 * | 1/2004 | Blackston | 81/451 |
| 6,684,741 | B2 * | 2/2004 | Blackston | 81/451 |
| 6,729,211 | B1 * | 5/2004 | Snow | 81/177.75 |
| 6,994,000 | B2 * | 2/2006 | Louthan et al. | 82/1.11 |
| 7,127,923 | B2 * | 10/2006 | Biederman et al. | 72/43 |
| D600,520 | S * | 9/2009 | Uchida | D8/21 |
| 2004/0128821 | A1 * | 7/2004 | Huang | 29/558 |
| 2011/0005356 | A1 * | 1/2011 | Kubota | 81/121.1 |

FOREIGN PATENT DOCUMENTS

| | | | |
|---|---|---|---|
| JP | 2001030180 | A * | 2/2001 |
| JP | 2002036130 | A * | 2/2002 |

* cited by examiner

*Primary Examiner* — Boyer D Ashley
*Assistant Examiner* — Sara Addisu

(57) ABSTRACT

The method for shaping a hexagonal tool of the present invention includes the following steps: preparing a hexagonal rod having an axis and a bottom, which has a periphery; fixing the hexagonal rod on a lathe, the lathe having a clamp and a lathe tool, the hexagonal rod being clamped and rotated about the axis by the clamp, the lathe tool lathing the hexagonal rod in a single operation to form a neck portion on the hexagonal rod, a driving head being defined on the hexagonal rod between the neck portion and the bottom; and lathing a rounding edge around the periphery of the bottom by the lathe tool. As such, a hexagonal tool having a neck portion and a driving head is thus quickly formed.

2 Claims, 6 Drawing Sheets

METHOD FOR SHAPING A HEXAGONAL TOOL

BACKGROUND OF THE INVENTION

1. Field of the Invention

The present invention relates to a method for shaping a hexagonal tool.

2. Description of the Prior Art

An L-shaped wrench is a common hexagonal wrench, and it is mainly used to engage with a hexagonal bore to stroke a bolt. Some of the L-shaped wrench is provided with a spherical or semi-spherical driving head to engage with the bore either vertically or slantedly.

However, such spherical or semi-spherical driving head is shaped by a milling machine, and thus the shaping process thereof is more complicated, expensive and time-consuming.

The present invention is, therefore, arisen to obviate or at least mitigate the above mentioned disadvantages.

SUMMARY OF THE INVENTION

The main object of the present invention is to provide an efficient method for shaping a hexagonal tool.

To achieve the above and other objects, the method of the present invention includes the following steps:

Preparing a hexagonal rod having an axis and a bottom, the bottom of the hexagonal rod having a periphery;

Fixing the hexagonal rod on a lathe, the lathe having a clamp and a lathe tool, the hexagonal rod being clamped and rotated about the axis by the clamp, the lathe tool lathing the hexagonal rod in a single operation to form a neck portion on the hexagonal rod, a driving head being defined on the hexagonal rod between the neck portion and the bottom; and Lathing a rounding edge around the periphery of the bottom by the lathe tool.

In the present invention, the driving head may have a dimension corresponding to a bore of a bolt. The rounding edge has an upper edge periphery, and the neck portion has an upper neck periphery. A distance between the upper edge periphery and the upper neck periphery is ½ to ⅗ of a diameter of the bolt.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
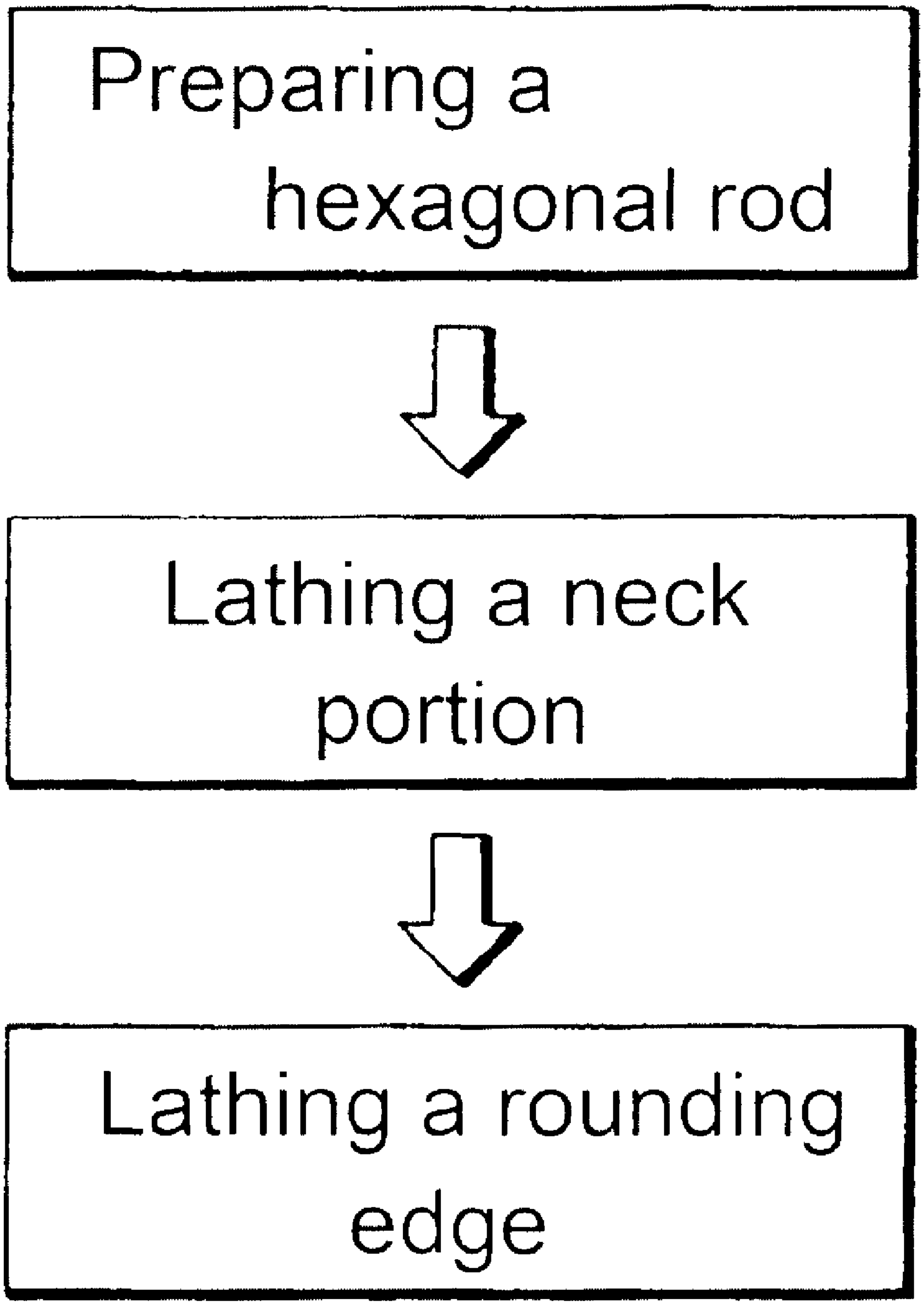
FIG. 1 is a flow chart showing a method of the present invention.
Figure 2:
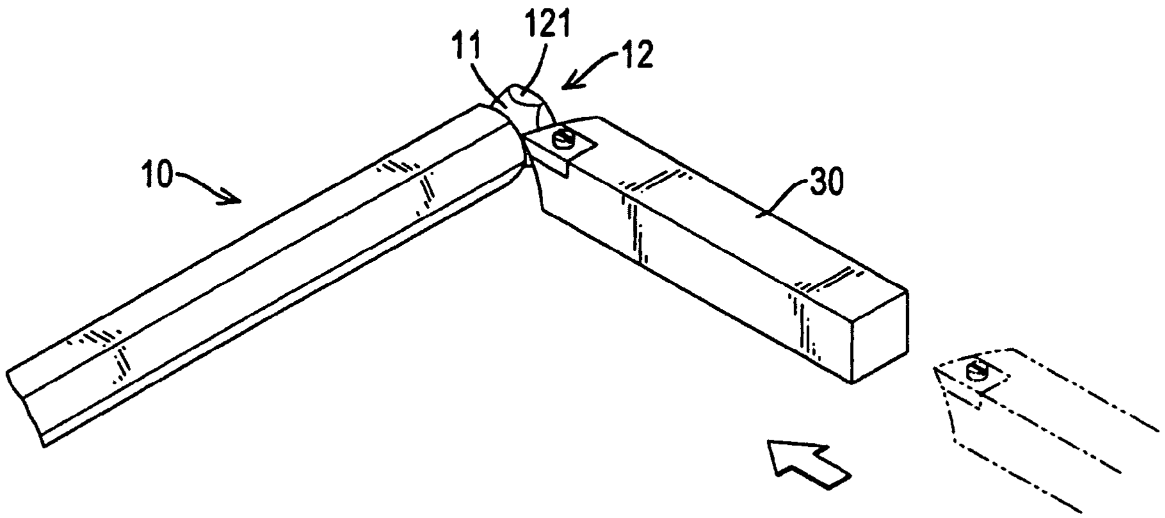
FIG. 2 is a perspective drawing showing a lathing process of a method of the present invention.
Figure 3:
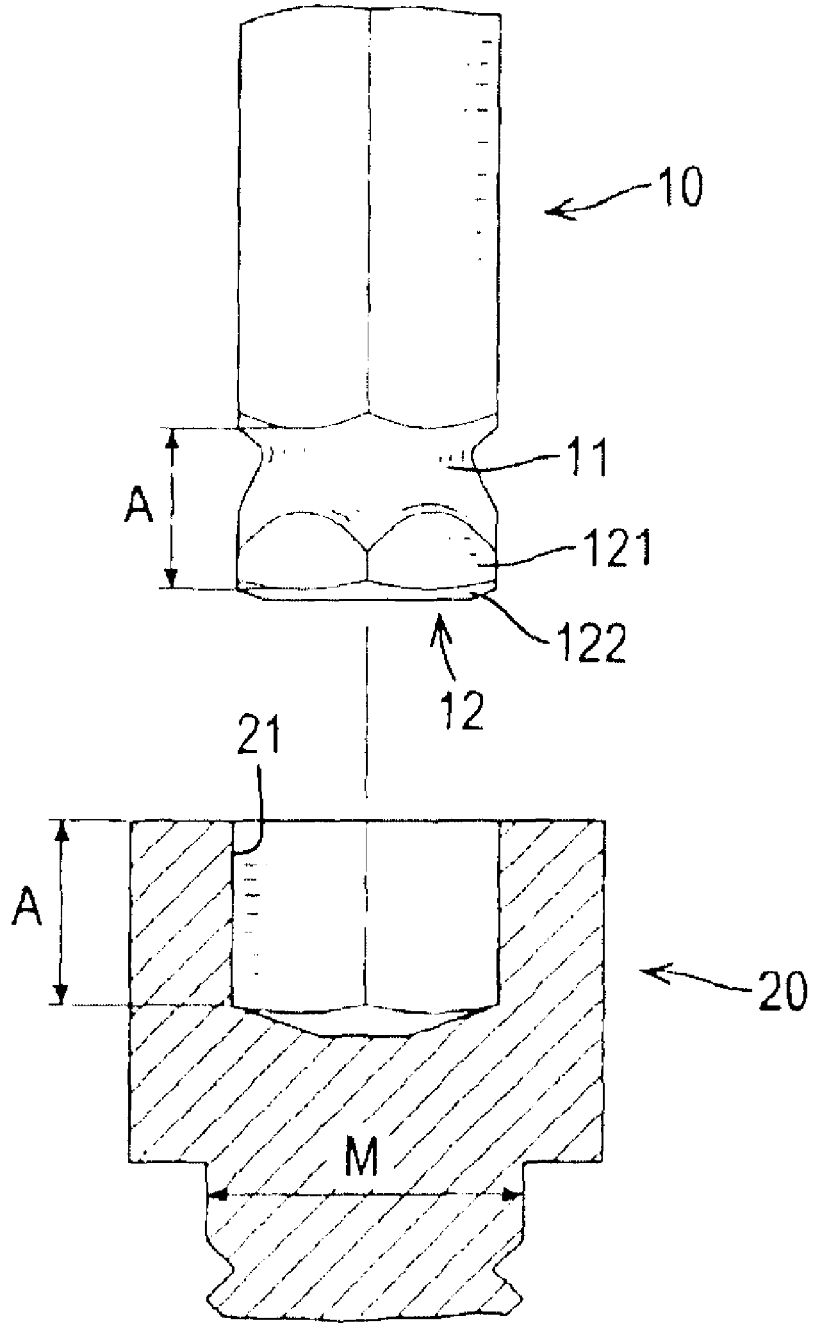
FIG. 3 is a drawing showing a driving head of a hexagonal tool to be engaged with a bolt.

Please refer to FIG. 1 to FIG. 3 for the method for shaping a hexagonal tool of the present invention, which includes the following steps:

A: Preparing a hexagonal rod 10 as shown in FIG. 2, which has an axis and a bottom. The dimension of the hexagonal rod 10 corresponds to a bore 21 of a bolt 20 as shown in FIG. 3. The diameter of the bolt 20 is M, and the depth thereof is H, which is no smaller than ½ M.

B: Fixing the hexagonal rod 10 on a lathe machine. More specifically, the lathe machine has a clamp and a lathe tool 30. The hexagonal rod 10 can be clamped and rotated about the axis by the clamp. As shown in FIG. 2, the lathe tool 30 lathes the hexagonal rod 10 in a single operation to form a neck portion 11 on the hexagonal rod 10. A driving head 12 is thus defined on the hexagonal rod 10 between the neck portion 11 and the bottom, and the driving head 12 has six engaging surfaces 121.

C: Lathing a rounding edge 122 around the periphery of the bottom by the lathe tool 30. Please refer to FIG. 3. The rounding edge 122 has an upper periphery, and the neck portion 11 also has an upper neck periphery. A distance A between the upper edge periphery and the upper neck periphery is ½ to ⅗ of the diameter M of the bolt 20.

Figure 4:
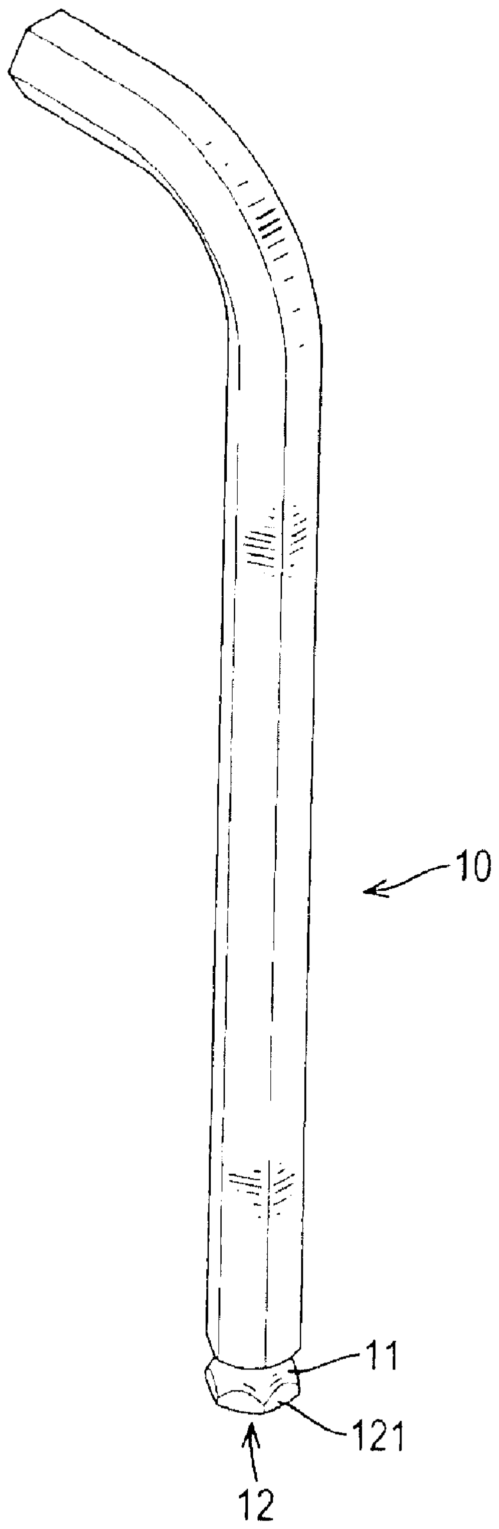
FIG. 4 is a perspective drawing showing a hexagonal tool shaped by the method of the present invention.
Figure 5:
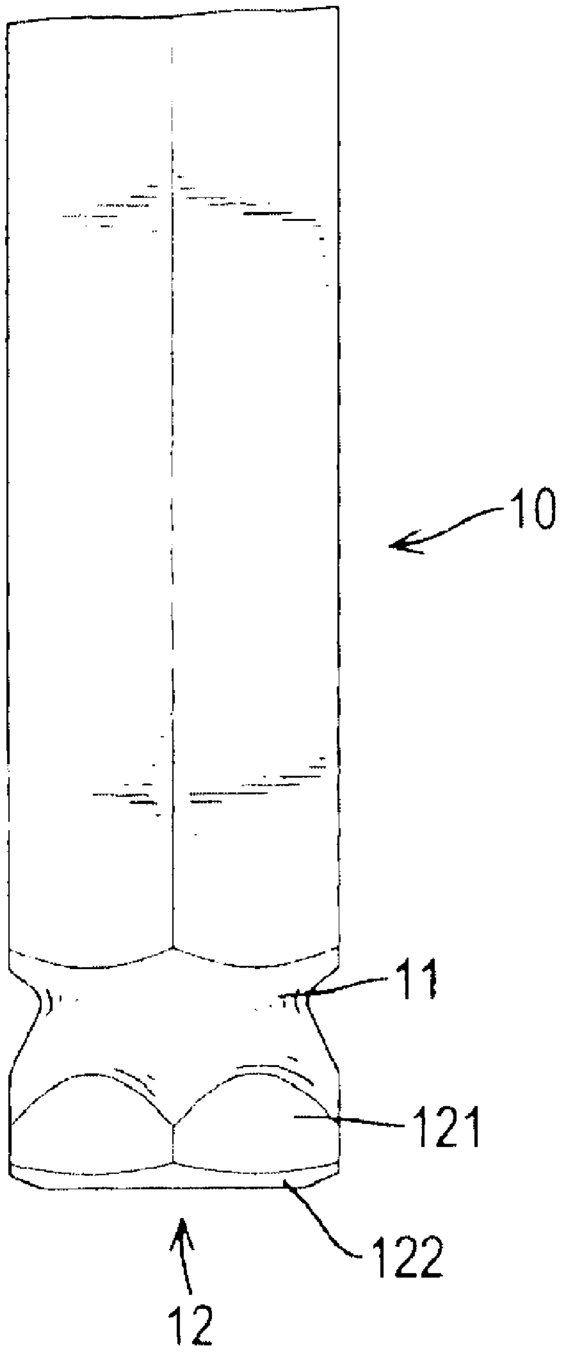
FIG. 5 is a side view showing a driving head of a hexagonal tool shaped by the method of the present invention.

The hexagonal tool shaped by the method of the present invention is shown in FIG. 3 to FIG. 5. It is noted that the shaping process is much more simplified and efficient because the neck portion is shaped in a lathing manner rather than in a milling manner in a single operation. Thus the cost of the hexagonal tool can also be lowered.

The hexagonal tool can be formed in an L shape as shown in FIG. 4, or it may also be formed in a T shape with a transversal handle.

Figure 6:
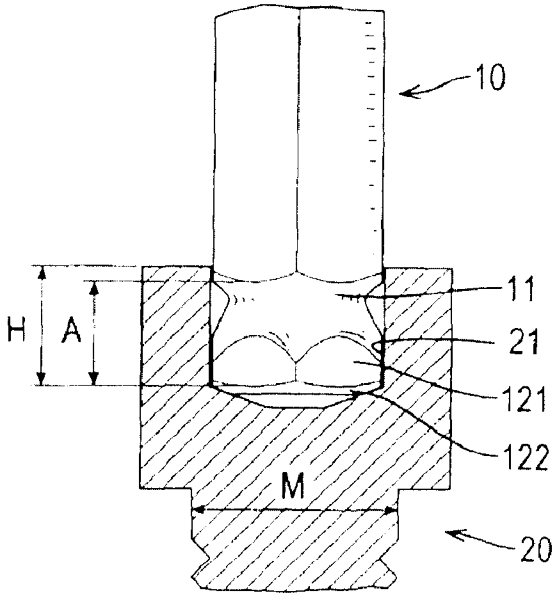
FIG. 6 is a drawing showing a driving head of a hexagonal tool engaging with a bolt vertically.

Please refer to FIG. 6. The driving head 12 of the hexagonal bore can insert in the bore 21 vertically, so that the driving force is transmitted vertically from the driving head 12 to the bolt 20.

Figure 7:
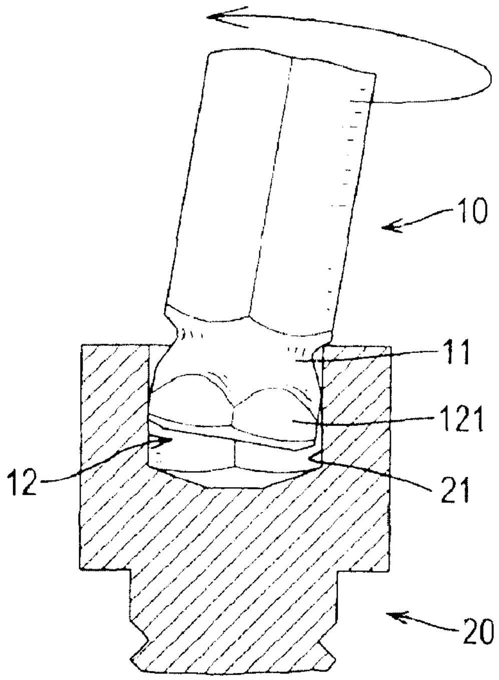
FIG. 7 is a drawing showing a driving head of a hexagonal tool engaging with a bolt slantedly.

Please refer to FIG. 7. The driving head 12 inserts in the bore 21 slantedly. Because the distance A between the upper edge periphery and the upper neck periphery is ½ to ⅗ of the diameter of the bolt 20, the upper neck periphery, in addition to the engaging surface 121, can also abuts against the bore 21. Thus the bolt 20 can be driven while the hexagonal tool is slanted.

What is claimed is:

1. A method for shaping a hexagonal tool, comprising the following steps:

preparing a hexagonal rod having an axis and a bottom, the bottom of the hexagonal rod having a periphery;

fixing the hexagonal rod on a lathe, the lathe having a clamp and a lathe tool, the hexagonal rod being clamped and rotated about the axis by the clamp, the lathe tool lathing the hexagonal rod in a single operation to form a neck portion on the hexagonal rod, a driving head being defined on the hexagonal rod between the neck portion and the bottom;

lathing a rounding edge around the periphery of the bottom by the lathe tool.

2. The method of claim 1, wherein the driving head has a dimension corresponding to a bore of a bolt; the rounding edge has an upper edge periphery, the neck portion has an upper neck periphery, a distance between the upper edge periphery and the upper neck periphery is ½ to ⅗ of a diameter of the bolt.

* * * * *